(12) United States Patent
Chheda et al.

(10) Patent No.: US 6,987,370 B2
(45) Date of Patent: Jan. 17, 2006

(54) METHOD AND SYSTEM FOR COOLING ELECTRONIC COMPONENTS

(75) Inventors: Sachin Navin Chheda, Roseville, CA (US); Stephan Karl Barsun, Auburn, CA (US); Ricardo E. Epinoza-Ibarra, Lincoln, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/602,972

(22) Filed: Jun. 23, 2003

(65) Prior Publication Data

US 2004/0257013 A1 Dec. 23, 2004

(51) Int. Cl.
*H02P 1/00* (2006.01)

(52) U.S. Cl. .................. 318/268; 318/254; 318/783
(58) Field of Classification Search ............. 318/268, 318/254, 138, 439, 595, 783, 782, 478, 473; 361/678; 308/934
See application file for complete search history.

(56) References Cited

U.S. PATENT DOCUMENTS

| 5,099,181 | A | * | 3/1992 | Canon ................. 318/254 |
|---|---|---|---|---|
| 5,598,314 | A | | 1/1997 | Hall |
| 6,128,905 | A | * | 10/2000 | Fahlsing ................ 60/661 |
| 6,182,902 | B1 | * | 2/2001 | Shih ..................... 236/35 |
| 6,198,245 | B1 | | 3/2001 | Du et al. |
| 6,236,184 | B1 | | 5/2001 | Baker |
| 6,356,435 | B1 | * | 3/2002 | Davis et al. ............ 361/678 |
| 6,400,045 | B1 | | 6/2002 | Hosohawa et al. |
| 6,438,984 | B1 | | 8/2002 | Novotny et al. |
| 6,474,409 | B1 | | 11/2002 | Sterner |
| 6,505,680 | B1 | | 1/2003 | Hegde |
| 6,561,261 | B2 | | 5/2003 | Wagner |
| 2003/0011984 | A1 | | 1/2003 | Chu et al. |
| 2003/0015983 | A1 | * | 1/2003 | Montero et al. ......... 318/473 |
| 2003/0063437 | A1 | | 4/2003 | Kurihara |
| 2003/0230939 | A1 | | 12/2003 | Hu et al. |

\* cited by examiner

*Primary Examiner*—Karen Masih (57) ABSTRACT

A localized system for dissipating heat generated by an electronic component includes a controllable cooling element and a control system for controlling the cooling element. The control system adjusts a speed of operation of the cooling element in response to variations in power consumption of the electronic component.

103 Claims, 9 Drawing Sheets

METHOD AND SYSTEM FOR COOLING ELECTRONIC COMPONENTS

BACKGROUND

Computers and other electronic devices contain numerous electronic components such as processors, memory and graphics products, and other integrated circuits (ICs) that give off heat. Most electronic components are heat-sensitive and may malfunction or become physically damaged if they become too hot. However, the heat threshold within which each component in a given electronic device can safely operate varies from component to component. Thus, system level cooling elements as well as cooling elements attached to individual ICs within an electronic device are vital to the functionality of many electronic devices. These cooling elements may be heat spreaders, fans, blowers, heat sinks, and others.

Some cooling elements can be controlled manually or by a control system that is part of an electronic device. For example, a fan can be controlled to operate at varying speeds. Controllable cooling elements are advantageous in many electronic devices because they save power and reduce overall system noise by not always operating at full speed.

Some electronic devices rely solely on system level cooling elements for their thermal management. In many electronic devices, however, system-wide cooling requires expensive and space-consuming overhead. Thus, in many instances, individual cooling solutions for some or all of the ICs within a particular electronic device are more efficient, require less space, and are less expensive than a system level cooling solution.

Most thermal control systems that are controllable are based on the temperature of the ICs that they cool. For example, a fan's speed may be increased if a particular IC's temperature rises to an undesirable level. However, a thermal control system that is based solely on an IC's temperature is sometimes inaccurate, inefficient, and unable to recognize and react to certain trends in the IC's power usage.

SUMMARY

A localized system for dissipating heat generated by an electronic component includes a controllable cooling element and a control system for controlling the cooling element. The control system adjusts a speed of operation of the cooling element in response to variations in power consumption of the electronic component.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

A method and system for controlling a cooling element associated with an integrated circuit (IC) are described herein. The control system uses the IC's temperature and power consumption as inputs into the control system. By monitoring not only the IC's temperature, but also its power consumption, the control system may predict the amount of heat generated by the IC and cool the IC with more accuracy and efficiency. The present system will be described, for ease of explanation only, in the context of an IC. However, the control system described herein may be used to cool many different electronic components and groups of components such as chipsets, central processing units (CPUs), voltage regulators, storage units, disk drives, input/output devices, and others.

Figure 1:
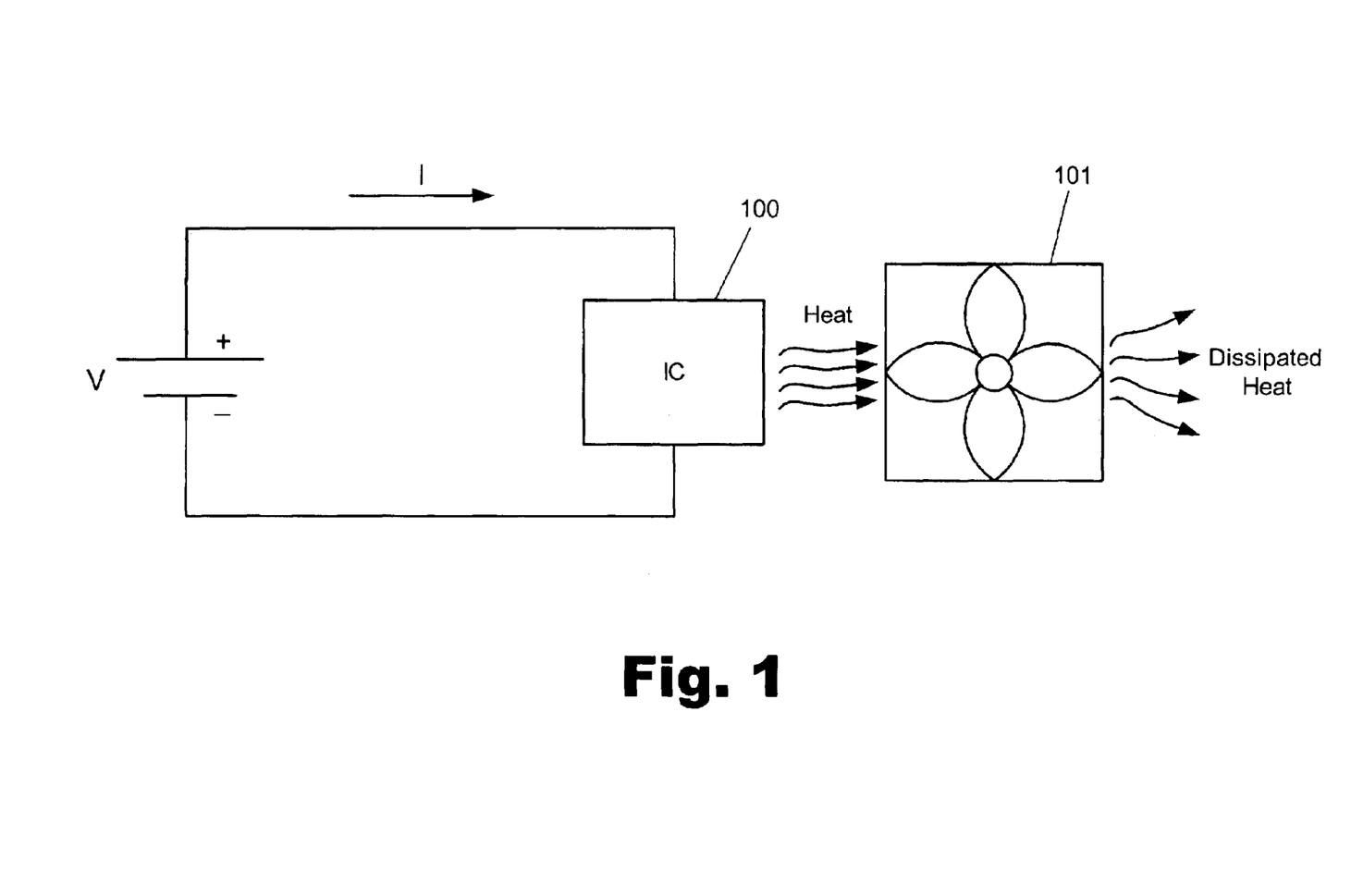
FIG. 1 shows an exemplary integrated circuit configuration with a cooling element according to an embodiment of the invention.

FIG. 1 shows an exemplary integrated circuit (IC) configuration with a cooling element, according to an exemplary embodiment. As shown in FIG. 1, an IC (100) requires a certain voltage (V) to operate. Associated with this voltage is a current (I) that is used by the IC (100) in its operation. The power (P) used, or consumed, by the IC (100) can be calculated using the formula $P=V*I$. In other words, the power used by the IC (100) is equal to the product of the voltage and current supplied to the IC (100). The same formula may be used to calculate the power consumed by any electronic component.

The voltage and current may be supplied by the system of which the IC (100) is a part. It is important to note that the configuration of FIG. 1 is exemplary in nature and that many other voltage supply configurations are possible. For example, the IC (100) could have multiple voltages. In this case, the consumed power may be computed by using the dominant voltage rail or a function of the different rails as the voltage value (V) in the power formula given above.

As shown in FIG. 1, the IC (100) generates heat during operation. For reasons known to one skilled in the art, most of the power consumed by the IC (100) results in heat. Thus, by calculating the power consumed by the IC (100), one can find the approximate amount of heat that is generated by the IC (100). In other words, the amount of heat generated by the IC (100) is roughly equivalent to the amount of power consumed by the IC (100).

FIG. 1 shows that the heat generated by the IC (100) is dissipated by a cooling element (101) according to an exemplary embodiment. The cooling element (101) helps prevent the IC (100) from overheating. If an IC overheats, it may temporarily malfunction or even be permanently destroyed. The cooling element (101) of the exemplary configuration of FIG. 1 is a fan or blower. However, the cooling element (101) may be, but is not limited to, a fan, blower, turbo cooler, heat sink, or a heat spreader, for example. It may be mounted on the IC (101) or it may be located near the IC (101) in an electronic device of which the IC (100) is a part. The cooling element (101) may be powered by the same source that powers the IC (101) or it may have its own power supply.

There may be more than one cooling element in a cooling solution for the IC (100). A cooling solution comprises the circuitry and cooling elements that dissipate the heat generated by the IC (100). For example, the IC (100) of FIG. 1 may have a cooling solution that includes a heat sink (not shown) mounted on top of it in addition to a fan or blower (101). The number of cooling elements used in a particular cooling solution will vary depending on the structure and temperature requirements of the ICs that are to be cooled.

A cooling element is controllable if its method of operation can be controlled manually or automatically (i.e., with a microcontroller) in response to a changing characteristic of the IC that it cools. The changing characteristic may be the IC's temperature, power consumption, or some other changing characteristic of the IC that is indicative of its changing temperature. If the cooling element (101) of FIG. 1 is controllable, its speed of operation may be adjusted in response to temperature changes and/or power consumption variations the IC (100). A controllable cooling solution that includes a controllable cooling element will be referred to herein and in the appended claims, unless otherwise specifically denoted, as a thermal control system or simply as a control system.

Some cooling elements are easier to control than others. For example, cooling elements that may be a part of a thermal control system include, but are not limited to, fans, blowers, and turbo coolers. Most heat sinks, on the other hand, are passive cooling elements, and are not controllable. However, some heat sinks may be controllable and therefore may be a part of a thermal control system according to an exemplary embodiment.

Figure 2:
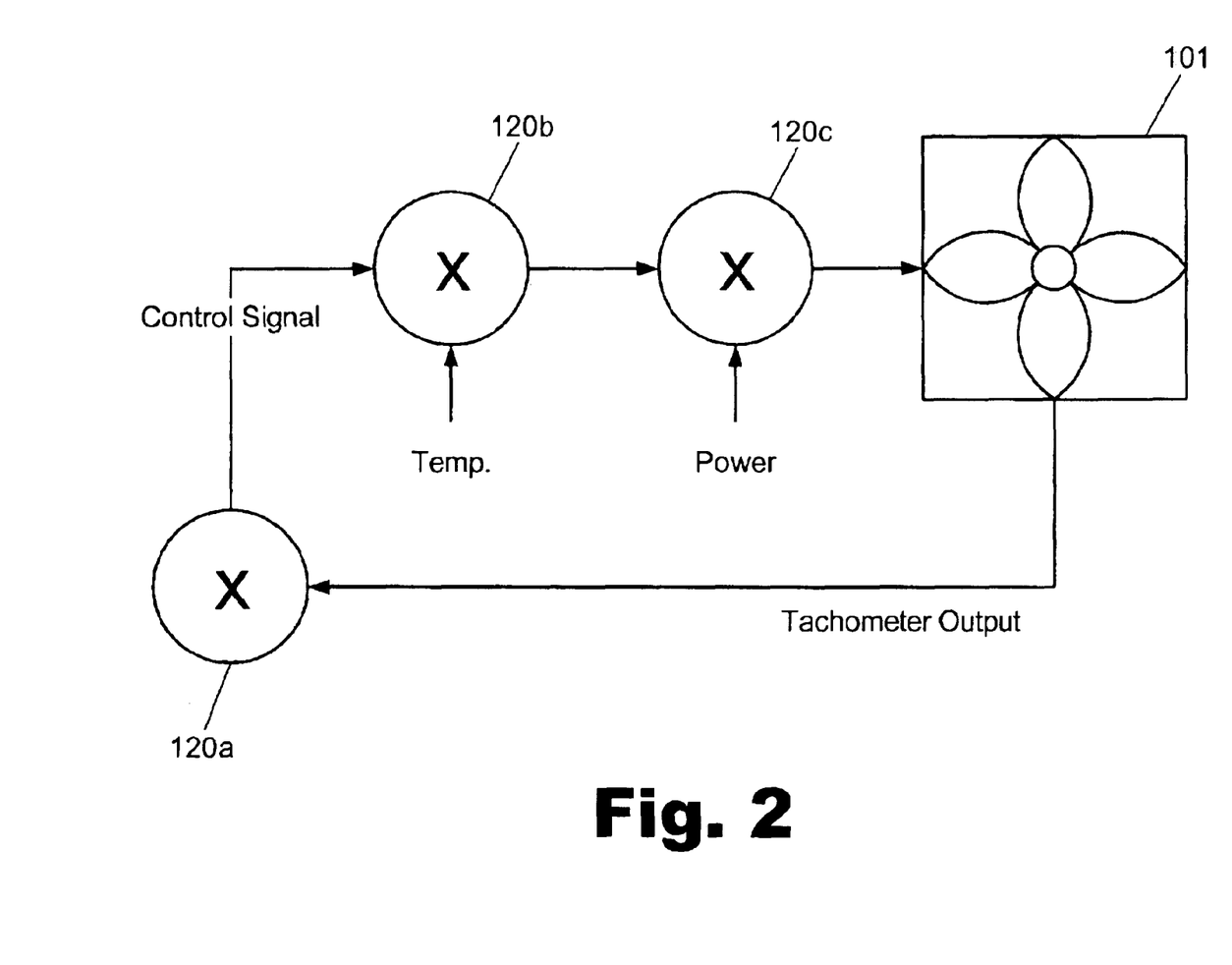
FIG. 2 shows an exemplary thermal control system according to an embodiment of the invention.

An exemplary thermal control system is shown in FIG. 2. In this exemplary embodiment, the control system is implemented using a closed loop control system. A closed loop control system, as shown in FIG. 2, is one that constantly monitors the output of the cooling element (101) and adjusts it according to any of a number of factors. For example, the control system of FIG. 2 consists of a number of control functions (120) that may be used to adjust a control signal that controls the speed of the cooling element (101).

The control functions (120) in FIG. 2 may perform any of a number of functions. The exact functions that they perform will vary as best serves a particular implementation of the control system. Thus, the following explanation of the control functions (120) will serve only as an illustration of some of the many possible functions that the control functions (120) may perform.

As shown in FIG. 2, the cooling element (101) is a controllable cooling element (101). For example, the cooling element (101) in FIG. 2 may be a fan or blower that has a tachometer output signal. The tachometer output signal is a measurement of how fast the cooling element (101) is operating. For example, the tachometer output signal may be a measurement of how fast a fan's motor is running in revolutions per minute (RPM). RPM will be used hereafter and in the appended claims, unless otherwise specifically denoted, as an exemplary measure of the speed or level of operation of a cooling element. Other measurements of the level of operation of a cooling element may also be used.

The tachometer output signal is input into the control function (120a), as shown in FIG. 2. The control function (120a) may multiply the tachometer output signal by a constant to amplify it before it is sent to the other control functions (120b,c). According to another embodiment, the control function (120a) compares the tachometer output signal with a preset value and adjusts the tachometer output signal accordingly. For example, the preset value may be an ideal RPM value for the cooling element (101). If the tachometer output signal is lower than the ideal RPM value, then a control signal that is output from the control function (120a) is modified so as to indicate to the cooling element (101) to increase its RPM. Likewise, if the tachometer output signals are higher than the ideal RPM value, then the control signal that is output from the control function (120a) is modified so as to indicate to the cooling element (101) to decrease its RPM.

An alternate embodiment is that the control system of FIG. 2 does not have the control function (120a). In this case, the tachometer output signal is fed directly into the control function (120b) from the cooling element (101).

Referring again to FIG. 2, the control function (120a) outputs a control signal. This control signal may be modified by other control functions (120b, c), as will be explained below. After it is modified, the control signal is fed back into the cooling element (101). Thus, the control system of FIG. 2 is a closed loop control system. The control signal controls the operational speed of the cooling element (101). For example, the amplitude of the control signal may be increased to increase the speed in RPM of the cooling element (101).

The control signal of FIG. 2 may be any type of control signal that controls the cooling element (101) and will vary as best serves a particular application. One exemplary control signal is a pulse width modulation (PWM) control signal. A PWM control signal varies the on/off duty-cycle of the supply voltage to the cooling element (101) using a drive transistor. In this way, the PWM control signal may efficiently control effective power delivered to the cooling element's (101) motor.

Another exemplary control signal is a linear voltage control signal. A linear voltage control signal varies the direct current (dc) voltage applied to the cooling element (101) to vary the cooling element's speed (e.g., RPM). Varying the dc voltage to some cooling elements, such as fans, changes their RPM proportionally.

Returning to FIG. 2, the control signal output from the control function (120a) is input into the control function (120b). The control function (120b) has another input for a signal comprising a temperature reading of the IC (100) that is being cooled by the control system. This temperature signal may be derived using inline sensing in the IC (100) itself. It may also be derived using many other temperature sensing devices or circuits.

The control function (120b) may perform one or more of a number of functions with the control signal and the temperature signal. For example, the control function (120b) may adjust the control signal based on variations in the temperature signal. If the temperature of the IC (100) increases, the control signal may be amplified or modified in a way that indicates to the cooling element (101) that it is to increase its RPM. Likewise, if the temperature of the IC (100) decreases, the control signal's amplitude may be decreased or modified in a way that indicates to the cooling element (101) that it may decrease its RPM. In this way, power may be conserved and system noise may be decreased when it is not necessary for the cooling element (101) to be operating at a high RPM.

Another exemplary embodiment is that the control function (120b) compares the temperature of the IC (100) to a preset value representing a maximum temperature at which the IC (100) may properly operate. For example, the maximum temperature at which the IC (100) may operate could be 75 degrees Celsius (C.). The control function (120b) may compare the IC's (100) actual temperature to this value and adjust the control signal so that the cooling element (101) cools the IC (100) to a temperature lower than the maximum allowable temperature. The control system may also be configured to send a failure signal to the IC (100) or to a system-level control system to shut down the IC (100) if its temperature goes above the maximum allowable temperature.

Another exemplary embodiment is that the control function (120b) compares the temperature of the IC (100) with a preset value representing an ideal temperature at which the IC (100) should operate. For example, the ideal temperature at which the IC (100) operates could be 30 degrees C. The control function (120b) may compare the IC's (100) actual temperature to this value and adjust the control signal so that the cooling element (101) cools the IC (100) to a temperature that is equivalent to this ideal temperature.

Yet another exemplary embodiment is that the control function (120b) performs a combination of the above-described functions. For example, the control function (120b) could linearly adjust the control signal based on variations in the temperature of the IC (100) while at the same time ensuring that the IC's (100) temperature does not exceed its maximum allowable temperature under which it may operate.

After the control signal has been modified by the control function (120b), it is fed into the control function (120c). The control function (120c) also has another input for a power signal comprising a power consumption reading of the IC (100) that is being cooled by the control system. This power signal may be derived by measuring the input voltage and current of the IC (100) and then using the power formula (P=V*I) described in connection with FIG. 1. The power signal may also be derived using other devices capable of measuring the power consumed by the IC (100).

The control function (120c) may perform one or more of a number of functions with the control signal and the power signal. For example, one exemplary embodiment is that the control function (120c) may adjust the control signal based on variations in the power consumed by the IC (100). As was explained in connection with FIG. 1, if the power consumed by the IC (100) increases, the IC (100) produces more heat. Thus, the control signal may be amplified or modified in a way that indicates to the cooling element (101) that it is to increase its RPM if there is additional heat that needs to be dissipated. Likewise, if the power consumed by the IC (100) decreases, the control signal's amplitude may be decreased or modified in a way that indicates to the cooling element (101) that it may decrease its RPM. In this way, power may be conserved and system noise may be decreased when it is not necessary for the cooling element (101) to be operating at a high RPM.

Because the control system monitors the power that is consumed by the IC (100) with the control function (120c), the control system may preemptively increase the RPM of the cooling element (101) and dissipate the heat as it is produced instead of waiting for the temperature to increase before cooling the IC (100). In other words, monitoring the IC's (100) power consumption enables the control system to predict the amount of heat that will be generated by the IC (100) and accordingly adjust the cooling element (101) to compensate for the increased heat.

As shown in FIG. 2, after the control signal is modified by the control function (120c), it is input into the cooling element (101) or into a circuit that controls the cooling element (101). According to an exemplary embodiment, the control signal either speeds up or slows down the RPM of the cooling element (101).

An alternate embodiment is that the control system illustrated in FIG. 2 does not have the control function (120b) that modifies the control signal based on the temperature of the IC (100). In this case, the only input from the IC (100) into the control system is the power signal that goes into the control function (120c).

Figure 3:
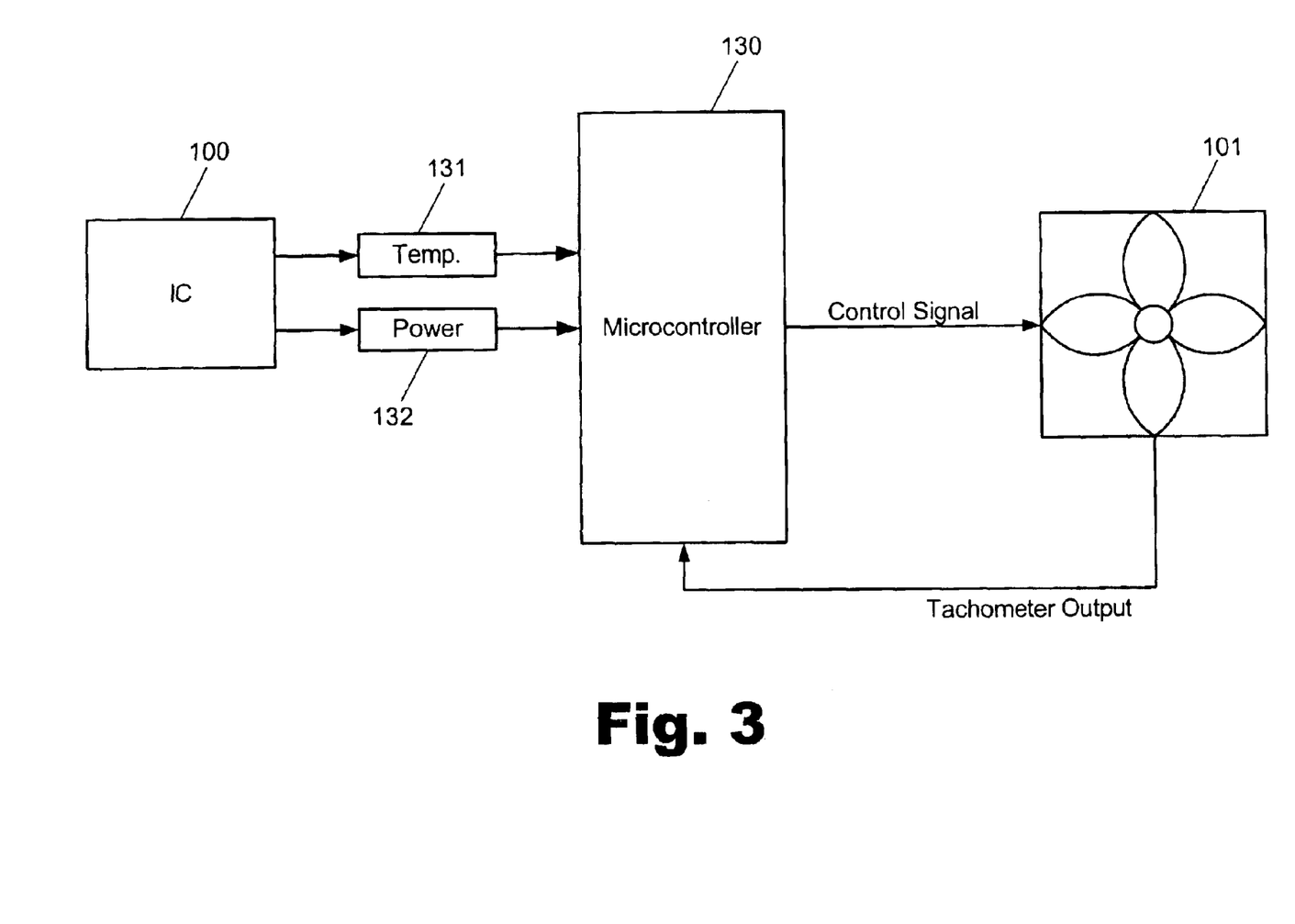
FIG. 3 illustrates an exemplary implementation of the control system using a microcontroller according to an embodiment of the invention.

The control system illustrated in FIG. 2 may be implemented in multiple ways. FIG. 3 illustrates an exemplary implementation of the control system using a microcontroller (130), according to an exemplary embodiment. As shown in FIG. 3, the microcontroller (130) has three inputs. One of the inputs is the tachometer output signal from the cooling element (101). The other two inputs are the temperature (131) and power (132) readings from the IC (100). The temperature and power inputs (131, 132) may be analog inputs according to one embodiment. However, they may be digital signal inputs according to another embodiment. As shown in FIG. 3, the microcontroller (130) outputs the control signal to the cooling element (101). Thus, the microcontroller (130) performs all of the control functions (120) described in connection with FIG. 2, according to an exemplary embodiment. The microcontroller (130) may be an application specific integrated circuit (ASIC), field-programmable gate array (FPGA), digital signal processor (DSP), or some other type of IC.

An alternate embodiment is that the control system may be implemented using analog components for each of the control functions (120). The exact method of implementation using analog components will be obvious to one skilled in the art and will not be explained herein.

Figure 4:
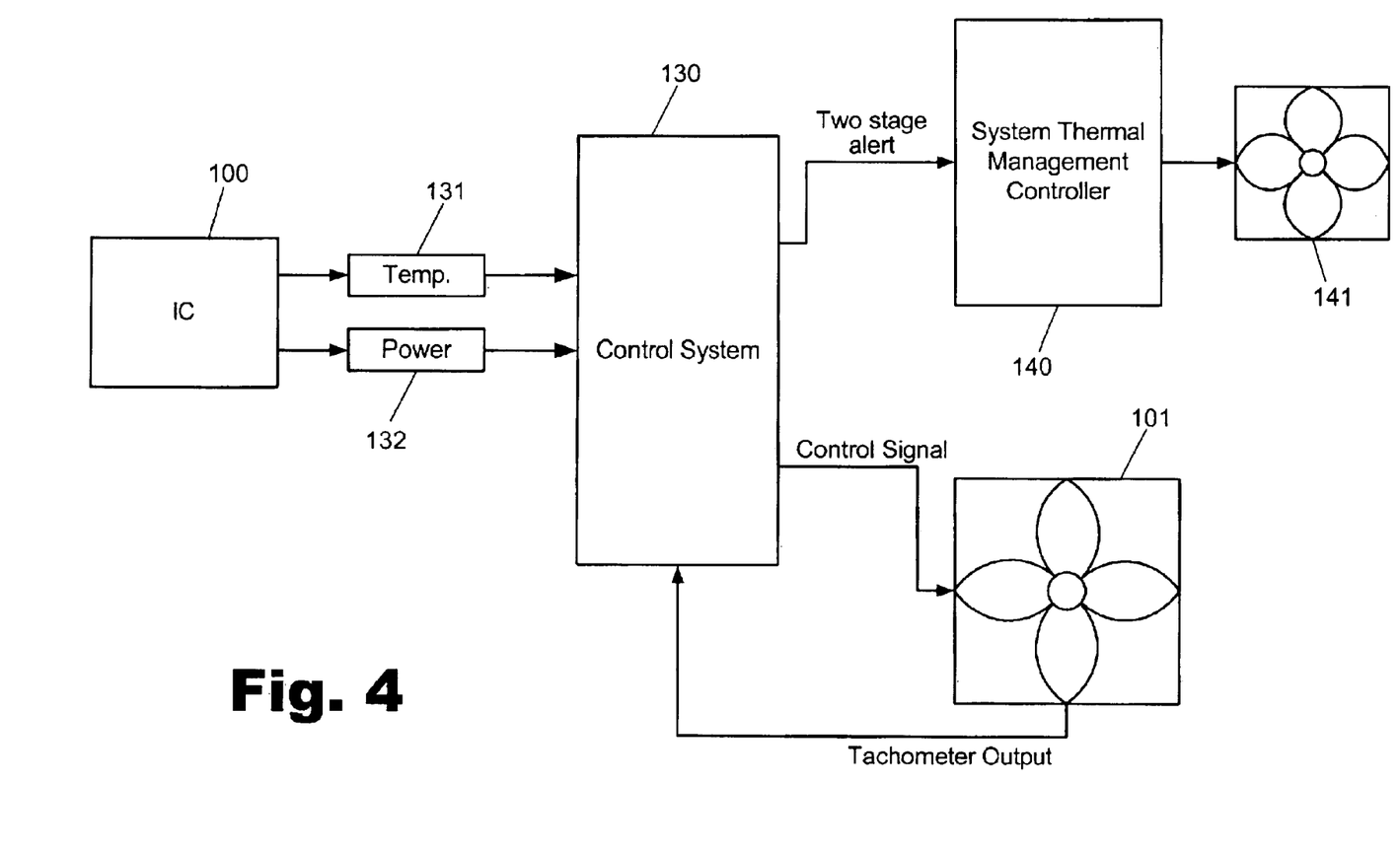
FIG. 4 is an exemplary configuration illustrating how the control system may be implemented in a system level cooling solution according to an embodiment of the invention.

The control system may be implemented in a system level cooling solution as shown in the exemplary configuration of FIG. 4. As shown in FIG. 4, a system thermal management controller (140) controls a system cooling element (141). The system cooling element (141) may be one or more of any of the cooling elements previously discussed. For example, the system cooling element (141) may be system fans. The system thermal management controller (140) controls the thermal environment of the system of which the IC (100) is a part.

As shown in FIG. 4, the IC's control system (130) in this configuration has two outputs. One output is the control signal that controls the cooling element (101). According to one exemplary embodiment, the other output is a two stage alert signal that goes to the system thermal management controller (140). The two stage alert signal may be a signal that performs two functions. The first stage alert request the system thermal management controller (140) to boost fan speed of the system cooling element (141). The second stage of the two stage alert signal may be a failure signal that requests the system thermal management controller (140) to shut down the entire system due to excessive heat that cannot be dissipated. The two stage alert signal is one of many possible alert signals that may be sent to the system thermal management controller (140). The exact performance requested by an alert signal will vary as best serves a particular application.

Figure 5:
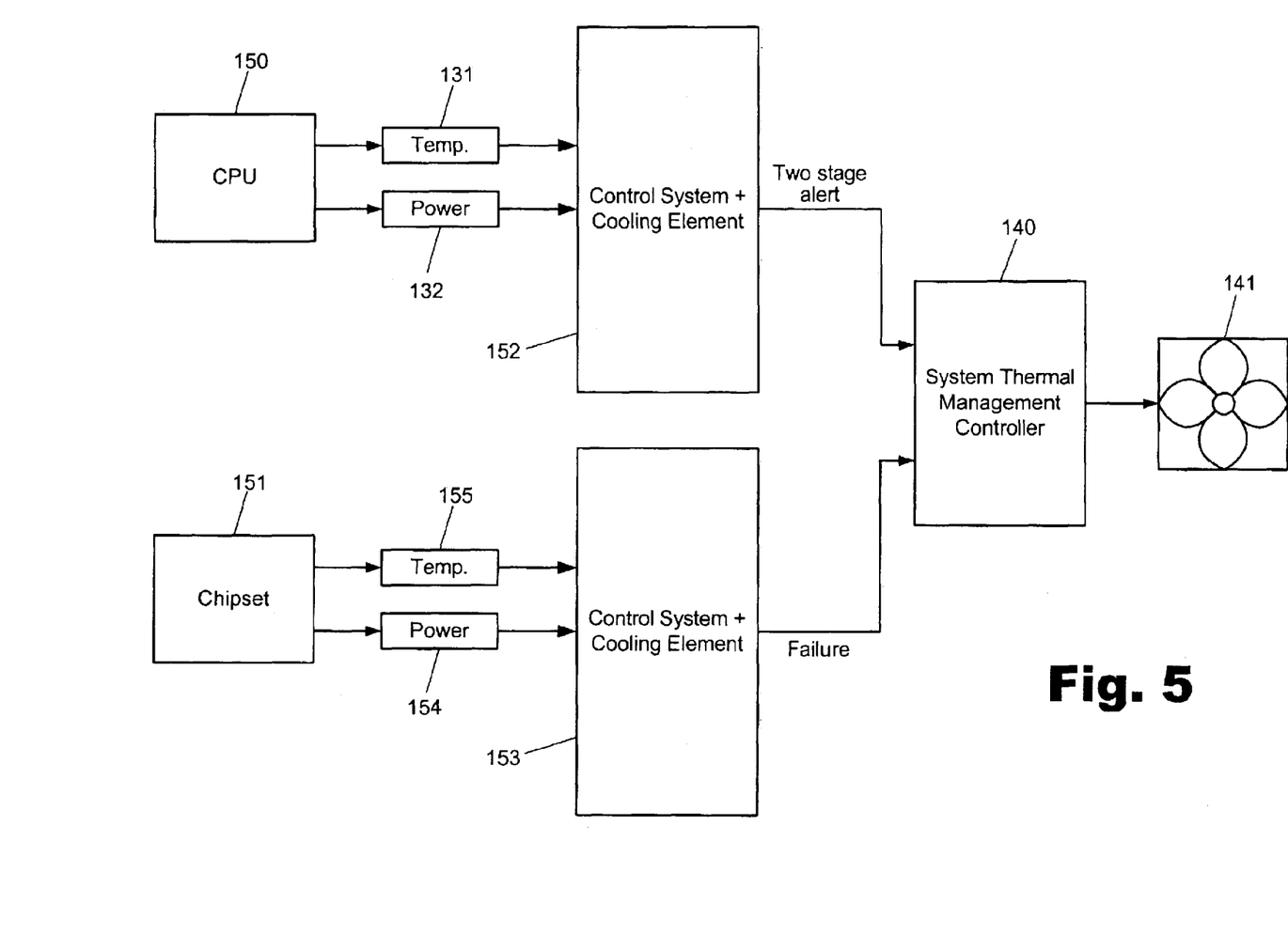
FIG. 5 illustrates how more than one control system and cooling element may be used in combination with a system level cooling solution according to an embodiment of the invention.

FIG. 5 illustrates an exemplary embodiment wherein more than one control system and cooling element may be used in combination with a system level cooling solution. As shown in FIG. 5, there are two control systems and cooling elements (151, 152) that are used in combination with the system thermal management controller (140) and system cooling element (141). Although the exemplary configuration of FIG. 5 has two control systems and cooling elements, other systems may have more than one or two control systems and cooling elements, as is readily apparent to one of ordinary skill in the art. As shown in FIG. 5, the cooling elements for the IC (100) and for the chipset (150) are not shown, but are integrated into the control systems blocks (151, 152) for ease of explanation.

The two components that are being cooled in FIG. 5 are a central processing unit (CPU) (150) and a chipset (151). A chipset is a group of microchips or ICs that are designed to work as a unit in performing one or more related functions. The CPU (150) and the chipset (151) are examples of many types of ICs that may be cooled in the same system such as input/output (10) controllers, memory units, etc.

FIG. 5 shows that the CPU (150) and the chipset (151) have their own localized cooling solutions. These cooling solutions are in addition to the system level cooling solution. This configuration may be used in low-end systems where the management processing power available is not adequate for babysitting multiple ICs.

As shown in FIG. 5, the CPU's control system (152) is configured to send a two stage alert to the system thermal management controller (140). The two stage alert signal is the same as the two stage alert signal described in connection with FIG. 4. The chipset's control system (153) is configured to send only a failure control signal to the system thermal management controller (140) requesting it to shut down the entire system or only the chipset (151). Again, the control signals that are sent to the system thermal management controller (140) may be any type of control signal. For example, the chipset's control system (153) may be configured to send two stage alert signal to the system thermal management controller (140).

Another exemplary embodiment is that a control system for the IC (100) may be created to have rules, or memory. In other words, the control system may be programmed or designed to recognize certain trends in power consumption, temperature variations, or irregular IC or system behavior. By recognizing such trends, variations, or irregular behavior, the control system can maintain an appropriate control signal to a cooling element.

Figure 6:
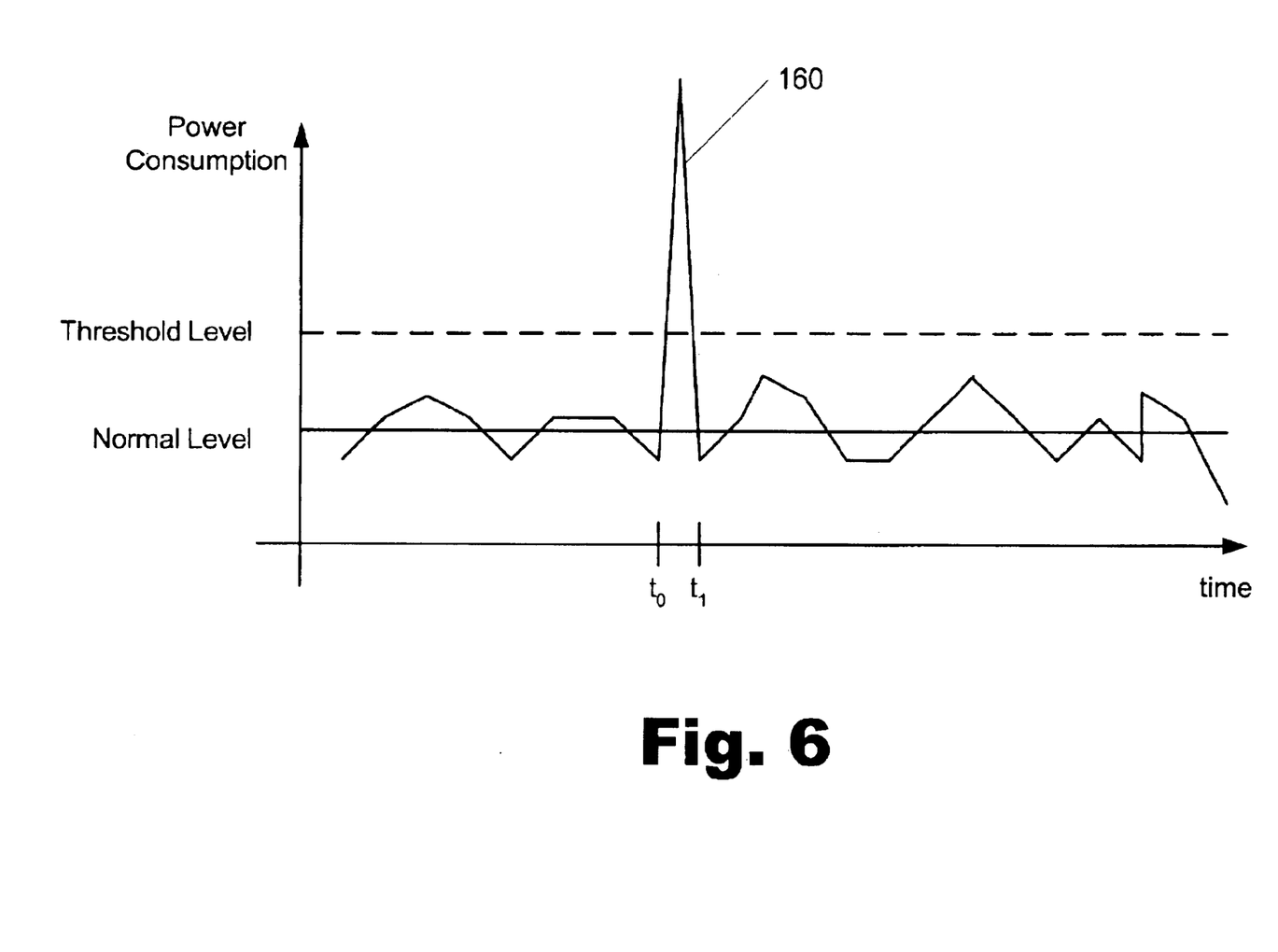
FIG. 6 is a graph illustrating power consumption by an integrated circuit for which a control system could be created or programmed to have memory according to an embodiment of the invention.

FIG. 6 is a graph illustrating power consumption by an IC for which a control system could be created or programmed to have memory. FIG. 6 shows an exemplary IC's power consumption as a function of time. As shown in FIG. 6, between the times $t_0$ and $t_1$, there is a short spike (160) in the power consumption that goes above a threshold level. The rest of the time, the power consumption only varies slightly around a normal level. According to an exemplary embodiment, the control system may be created or programmed to ignore a spike (160) in power consumption that goes above a specified threshold if it lasts less than a specified amount of time. For example, the specified amount of time may be 250 milliseconds and the threshold may be 70 watts. In this case, if the spike (160) in power consumption is above 70 watts for 150 milliseconds, then the control loop would ignore the spike (160) and not increase the speed of the cooling element (101) to compensate for temporary increase in power consumption. The specified threshold and the specified amount of time will vary as best serves a particular application.

There are a number of applications that may use a control loop with memory for the situation described on connection with FIG. 6. For example, a CPU might process mostly integer numbers. But, occasionally it processes floating point numbers. When the CPU processes a floating point number, there is a spike in power consumption similar to the spike (160) of FIG. 6.

Figure 7:
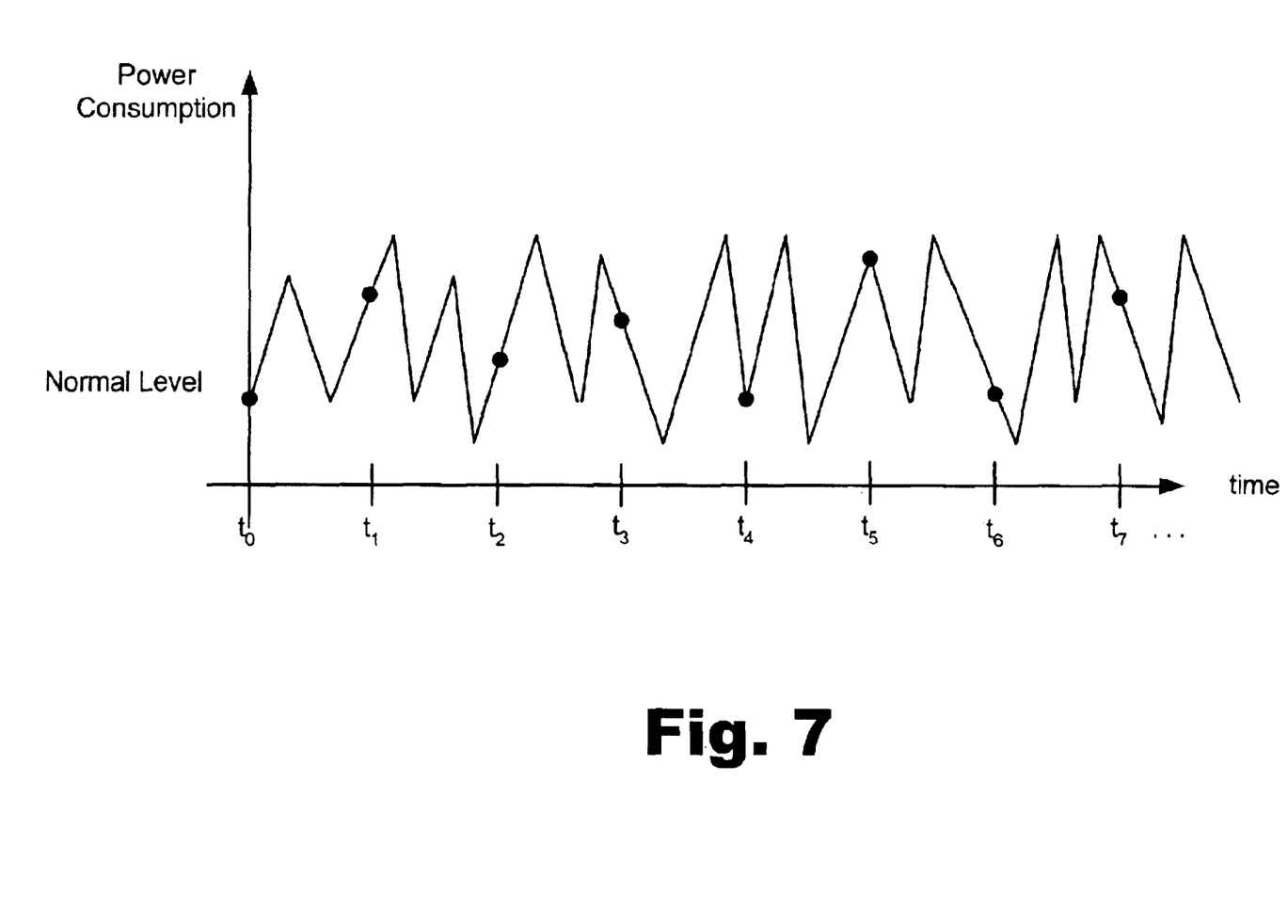
FIG. 7 is graph illustrating power consumption by an IC for which variations in the power consumption may require the control system to selectively ignore variations in power consumption according to an embodiment of the invention.

According to another exemplary embodiment, the control system may have memory or rules that allow it to selectively ignore variations in power consumption. FIG. 7 is a graph illustrating power consumption by an IC for which variations in the power consumption may require the control system to selectively ignore variations in power consumption. FIG. 7 shows an exemplary IC's power consumption as a function of time. As shown in FIG. 7, the power consumption varies frequently. In some applications, the cooling element (101) is not capable of changing speeds at the same rate that the power consumption varies. Therefore, according to this exemplary embodiment, the control system may ignore some of the variations in power consumption and use instead use periodic readings of the power consumption as the input into the control function (120c). FIG. 7 shows that the control system uses the values of power consumption at the times $t_0, t_1, \ldots, t_7$.

An alternate embodiment to that described in connection with FIG. 7 is that the control system selects every n-th variation in the power consumption. For example, if the power consumption varies 50 million times per second, the control system selects every 10 millionth variation to use as the input into the control function (120c).

The rules that may be programmed into the control system that have been described above are examples of many different rules that the control system may have. Additional rules may be implemented to recognize other trends in power consumption or in temperature change of an IC as best serves a particular application.

Another exemplary embodiment entails using the control system to perform predictive failure analysis. The control system may collect and store in memory data related to the cooling element. This data may be variation in operation speed, amount of power consumed by the cooling element, etc. The control system may then analyze this data and recognize trends that may indicate that the cooling element has a certain percentage of failing after a certain amount of time. The control system may be programmed to recognize these trends and react to them in a number of ways. For example, in one embodiment, the control system reports to a higher entity the existence of these conditions that may predate a failure. Exemplary higher entities may be, but are not limited to, system level thermal management processors and service personnel. An alternate embodiment is that the control system may disable a cooling element that it has determined to have a high chance of failure and enable a backup cooling element in its place.

Figure 8:
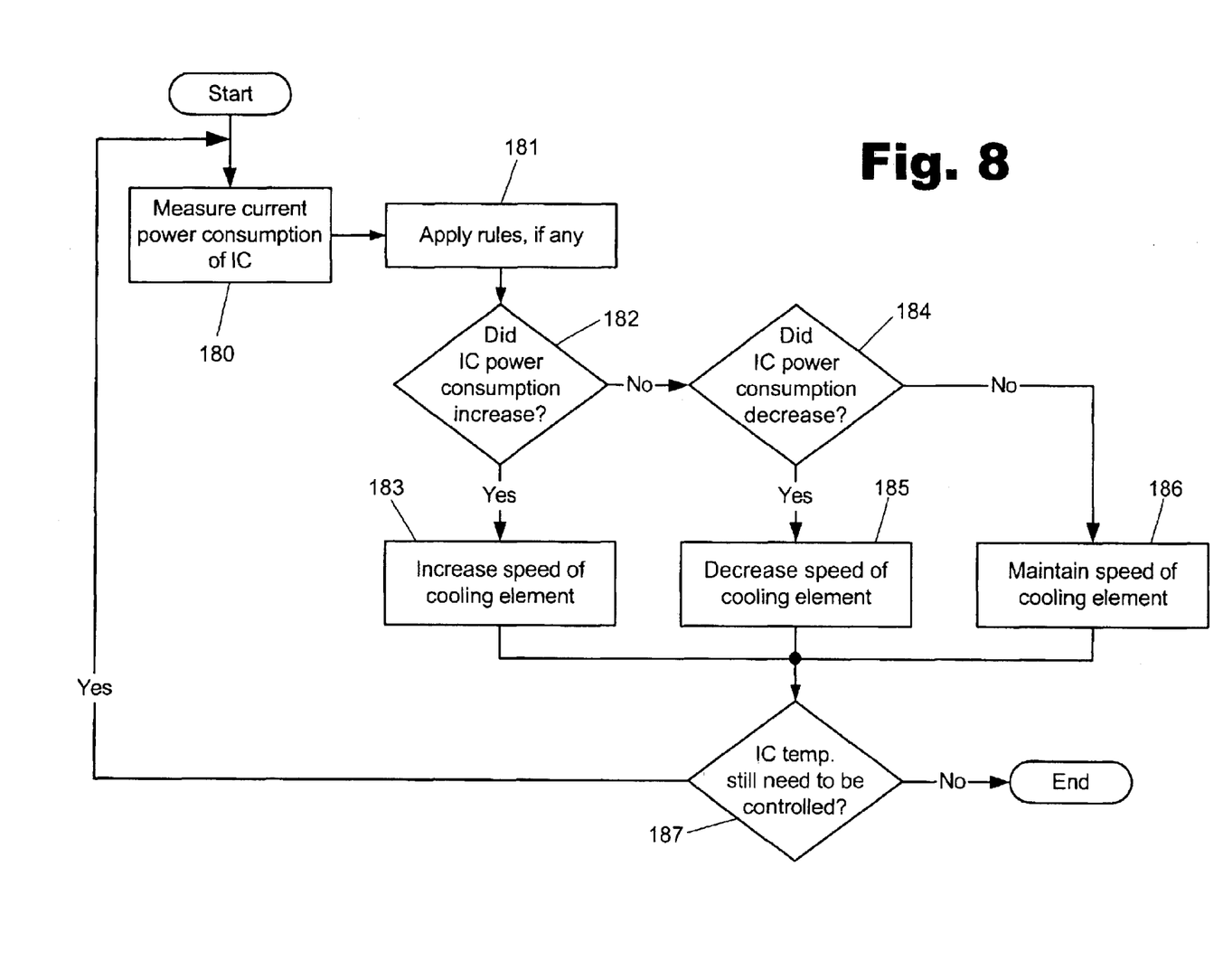
FIG. 8 is a flow chart illustrating a possible method of implementing the present control system with memory according to an embodiment of the invention.

FIG. 8 is a flow chart illustrating a possible method of implementing the present control system with memory according to one exemplary embodiment. The steps of FIG. 8 correspond to the control function (120c; FIG. 2) that has an input for the power signal. The steps of FIG. 8 may be programmed into the control system. They may also be performed by a processor or another device configured to perform them.

As shown in FIG. 8, the initial step is measuring the current power consumption of the IC that is being cooled (180). Next, any rules, or memory, that have been programmed into the control system are applied (181). These rules may be any of the rules that have been already described above. The control system then determines whether the IC power consumption has increased from the previous measurement of the power consumption (182). If it has, the speed of the cooling element is increased (183). If the IC power consumption did not increase, but decreased (184), then the speed of the cooling element is decreased (184). If the power consumption did not increase or decrease, the cooling element's speed may be maintained at its previous rate (186). However, an alternate step (not shown) to step (184) is that if the power consumption did not increase or decrease, the cooling element's speed may be decreased.

Figure 9:
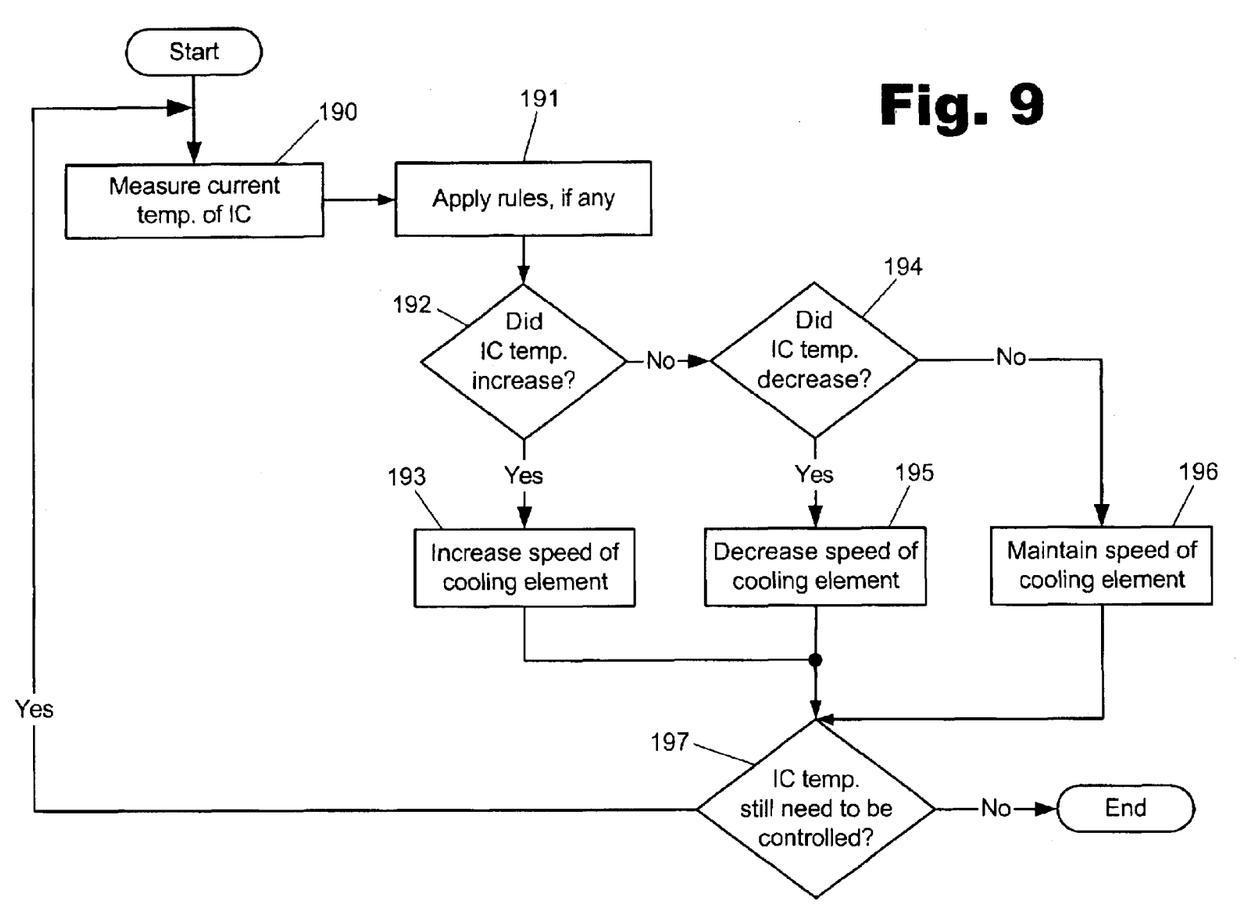
FIG. 9 is another flow chart illustrating a possible method of implementing the present control system with memory according to an embodiment of the invention.

FIG. 9 is another flow chart illustrating a possible method of implementing the present control system with memory according to one exemplary embodiment. The steps of FIG. 8 correspond to the control function (120b; FIG. 2) that has an input for the IC temperature reading. The steps of FIG. 9 may be programmed into the control system. They may also be performed by a processor or another device configured to perform them.

As shown in FIG. 9, the initial step is measuring the current temperature of the IC that is being cooled (190). Next, any rules, or memory, that have been programmed into the control system are applied (191). These rules may be any of the rules that have been already described above. The control system then determines whether the IC temperature has increased from the previous measurement of the temperature (192). If it has, the speed of the cooling element is increased (193). If the IC temperature did not increase, but decreased (194), then the speed of the cooling element is decreased (194). If the temperature did not increase or decrease, the cooling element's speed may be maintained at its previous rate (196). However, an alternate step (not shown) to step (194) is that if the temperature did not increase or decrease, the cooling element's speed may be decreased.

The methods described in FIG. 8 and FIG. 9 may be performed simultaneously, according to an exemplary embodiment. They may also be integrated so as to function with system thermal management controller (140; FIG. 5).

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A localized system for dissipating heat generated by an electronic component, said system comprising:
    a controllable cooling element; and
    a control system for controlling said cooling element;
    wherein said control system monitors actual power consumption of said electronic component and adjusts a speed of operation of said cooling element in response to variations in power consumption of said electronic component.

2. The system of claim 1, wherein said control system further adjusts said speed of said cooling element in response to variations in temperature of said electronic component.

3. The system of claim 1, wherein said control system increases said speed of said cooling element when said power consumption of said electronic component increases.

4. The system of claim 1, wherein said control system decreases said speed of said cooling element when said power consumption of said electronic component decreases.

5. The system of claim 2, wherein said control system increases said speed of said cooling element when said temperature of said electronic component increases.

6. The system of claim 2, wherein said control system decreases said speed of said cooling element when said temperature of said electronic component decreases.

7. The system of claim 1, wherein said cooling element is a fan.

8. The system of claim 1, wherein said cooling element is a blower.

9. The system of claim 1, wherein said cooling element is a turbo fan.

10. The system of claim 1, wherein said cooling element is a controllable heat sink or heat spreader.

11. The system of claim 2, wherein said localized system is implemented in a system level cooling solution, said system level cooling solution comprising:
    a system cooling element; and
    a system thermal management controller for controlling said system cooling element.

12. The system of claim 11, wherein said control system outputs an alert signal to said system thermal management controller, said alert signal signaling to said system thermal management controller to manage said system cooling element.

13. The system of claim 12, wherein said alert signal is a two stage alert signal, said two stage alert signal comprising:
    a first stage alert signal requesting said system thermal management controller to increase a speed of said system cooling element; and
    a second stage alert signal requesting said system thermal management controller to shut down said electronic component.

14. The system of claim 2, wherein said system is used in combination with one or more other localized systems for dissipating heat generated by electronic components in addition to said electronic component in an electronic device.

15. The system of claim 14, wherein each of said localized systems is implemented in a system level cooling solution, said system level cooling solution comprising:
    a system cooling element; and
    a system thermal management controller for controlling said system cooling element.

16. The system of claim 2, wherein said control system is implemented using analog components.

17. The system of claim 2, wherein said control system is configured with rules for recognizing trends in said variations in temperature and adjusting said speed of said cooling element according to said rules.

18. The system of claim 1, wherein said electronic component is an integrated circuit.

19. The system of claim 1, wherein said electronic component is a central processing unit.

20. The system of claim 1, wherein said electronic component is a chipset, storage unit, processor, or voltage regulator.

21. A localized system for dissipating heat generated by an electronic component, said system comprising:
    a controllable cooling element; and a control system for controlling said cooling element;

wherein said control system adjusts a speed of operation of said cooling element in response to variations in power consumption of said electronic component;

wherein said control system comprises:

a first control function for receiving a tachometer output signal from said cooling element and outputting a control signal for adjusting said speed of said cooling element, said tachometer output signal being a measurement of said speed of said cooling element; and a second control function for modifying a control signal output from said first control function, said modification based on a reading of said power consumption of said electronic component;

wherein, after said control signal is modified by said second control function, said control signal is input into said cooling element and adjusts said speed of said cooling element.

22. The system of claim 21, wherein said second control function comprises an input for a power signal, said power signal comprising said reading of said power consumption of said electronic component.

23. The system of claim 21, wherein a microcontroller comprises said control system.

24. A localized system for dissipating heat generated by an electronic component, said system comprising:

a controllable cooling element; and a control system for controlling said cooling element;

wherein said control system adjusts a speed of operation of said cooling element in response to variations in power consumption of said electronic component;

wherein said control system comprises:

a first control function for receiving a tachometer output signal from said cooling element and outputting a control signal for adjusting said speed of said cooling element, said tachometer output signal being a measurement of said speed of said cooling element;

a second control function for modifying said control signal, said modification based on a reading of said power consumption of said electronic component; and a third control function for modifying said control signal, said modification based on a reading of a temperature of said electronic component;

wherein, after said control signal is modified by said second and said third control functions, said control signal is input into said cooling element and adjusts said speed of said cooling element.

25. The system of claim 24, wherein said second control function comprises an input for a power signal, said power signal comprising said reading of said power consumption of said electronic component.

26. The system of claim 25, wherein, if said reading of said power consumption is higher than a previous reading of said power consumption, said second control function modifies said control signal in a manner that results in an increase of said speed of said cooling element.

27. The system of claim 25, wherein, if said reading of said power consumption is lower than a previous reading of said power consumption, said second control function modifies said control signal in a manner that results in a decrease of said speed of said cooling element.

28. The system of claim 24, wherein said third control function comprises an input for a temperature signal, said temperature signal comprising said reading of said temperature of said electronic component.

29. The system of claim 28, wherein said third control function:

compares said reading of said temperature of said electronic component to a preset value representing a maximum temperature at which said electronic component may properly operate; and modifies said control signal in a manner that results in said speed of said cooling element being adjusted to cool said electronic component to a temperature equal to or lower than said maximum temperature.

30. The system of claim 29, wherein said control system is configured to shut down said electronic component if said temperature of said electronic component goes above said maximum temperature.

31. The system of claim 28, wherein said third control function:

compares said reading of said temperature of said electronic component to a preset value representing an ideal temperature at which said electronic component should operate; and modifies said control signal in a manner that results in said speed of said cooling element being adjusted to cool said electronic component to or below said ideal temperature.

32. The system of claim 28, wherein, if said reading of said temperature of said electronic component is higher than a previous reading of said temperature, said third control function modifies said control signal in a manner that results in an increase of said speed of said cooling element.

33. The system of claim 28, wherein, if said reading of said temperature of said electronic component is lower than a previous reading of said temperature, said third control function modifies said control signal in a manner that results in a decrease of said speed of said cooling element.

34. The system of claim 24, wherein said control signal is a pulse width modulation control signal.

35. The system of claim 24, wherein said control signal is a linear voltage control signal.

36. The system of claim 24, wherein said first control function multiplies said tachometer output signal by an amplifying constant.

37. The system of claim 24, wherein said first control function:

compares said tachometer output signal to a value representing an ideal speed for said cooling element; and generates said control signal based on said comparison.

38. The system of claim 24, wherein a microcontroller comprises said control system.

39. The system of claim 38, wherein said microcontroller further comprises analog inputs for a temperature signal and a power signal, said temperature signal comprising said reading of said temperature of said electronic component, said power signal comprising said reading of said power consumption of said electronic component.

40. A localized system for dissipating heat generated by an electronic component, said system comprising:

a controllable cooling element; and a control system for controlling said cooling element;

wherein said control system adjusts a speed of operation of said cooling element in response to variations in power consumption of said electronic component; and wherein said control system is configured with rules for recognizing trends in said power consumption and adjusting said speed of said cooling element according to said rules.

41. The system of claim 40, wherein one of said rules enables said control system to recognize a spike in power consumption and ignore said spike if said spike does not last more than a specified amount of time.

42. The system of claim 40, wherein one of said rules enables said control system to selectively ignore said variations in power consumption.

43. The system of claim 40, wherein one of said rules enables said control system to perform predictive failure analysis.

44. The system of claim 43, wherein said control system sends a signal to a system thermal management controller reporting trends that indicate possible failure of said cooling element.

45. The system of claim 43, wherein said control system shuts down said cooling element and enables a backup cooling element if said predictive failure analysis indicates that said cooling element could possibly fail within a set amount of time.

46. A method of dissipating heat generated by an electronic component, said method comprising:
   monitoring actual power consumption of said electronic components; and
   adjusting a speed of operation of a cooling element with a control system in response to variations in power consumption of said electronic component.

47. The method of claim 46, further comprising adjusting said speed of said cooling element in response to variations in temperature of said electronic component.

48. The method of claim 46, further comprising increasing said speed of said cooling element when said power consumption of said electronic component increases.

49. The method of claim 46, further comprising decreasing said speed of said cooling element when said power consumption of said electronic component decreases.

50. The method of claim 47, further comprising increasing said speed of said cooling element when said temperature of said electronic component increases.

51. The method of claim 47, further comprising decreasing said speed of said cooling element when said temperature of said electronic component decreases.

52. The method of claim 47, further comprising implementing said control system in a system cooling solution.

53. The method of claim 52, further comprising outputting an alert signal from said control system to said system cooling solution, said system cooling solution comprising a system cooling element.

54. The method of claim 53, further comprising sending said alert signal in two stages, said two stages comprising:
   a first stage alert signal requesting said system cooling solution to increase a speed of said system cooling element; and
   a second stage alert signal requesting said system cooling solution to shut down said electronic component.

55. The method of claim 47, further comprising using said control system in combination with one or more other control systems for dissipating heat generated by electronic components in addition to said electronic component in an electronic device.

56. The method of claim 55, further comprising implementing each of said control systems in a system level cooling solution, said system level cooling solution comprising a system cooling element.

57. The method of claim 47, further comprising recognizing trends in said variations in temperature and adjusting said speed of said cooling element according to rules programmed into said control system.

58. A method of dissipating heat generated by an electronic component, said method comprising:
   adjusting a speed of operation of a cooling element with a control system in response to variation in power consumption of said electronic component;
   generating a control signal for adjusting said speed of said cooling element with a first control function, said control signal derived from a tachometer output signal from said cooling element;
   modifying said control signal with a second control function, said modification based on a reading of said power consumption of said electronic component; and
   controlling said cooling element with said control signal that has been modified.

59. A method of dissipating heat generated by an electronic component, said method comprising:
   adjusting a speed of operation of a cooling element with a control system in response to variation in power consumption of said electronic component;
   generating a control signal for adjusting said speed of said cooling element with a first control function, said control signal derived from a tachometer output signal from said cooling element;
   modifying said control signal with a second control function, said modification based on a reading of said power consumption of said electronic component;
   modifying said control signal with a third control function, said modification based on a reading of a temperature of said electronic component; and
   controlling said cooling element with said control signal that has been modified.

60. The method of claim 58, further comprising modifying said control signal in a manner that results in an increase of said speed of said cooling element if said reading of said power consumption is higher than a previous reading of said power consumption.

61. The method of claim 58, further comprising modifying said control signal in a manner that results in a decrease of said speed of said cooling element if said reading of said power consumption is lower than a previous reading of said power consumption.

62. The method of claim 59, further comprising:
   comparing with said third control function said reading of said temperature of said electronic component to a preset value representing a maximum temperature at which said electronic component may properly operate; and
   modifying said control signal in a manner that results in said speed of said cooling element being adjusted to cool said electronic component to a temperature equal to or lower than said maximum temperature.

63. The method of claim 62, further comprising shutting down said electronic component if said temperature of said electronic component goes above said maximum temperature.

64. The method of claim 59, further comprising:
   comparing said reading of said temperature of said electronic component to a preset value representing an ideal temperature at which said electronic component should operate; and
   modifying said control signal in a manner that results in said speed of said cooling element being adjusted to cool said electronic component to or below said ideal temperature.

65. The method of claim 59, further comprising modifying said control signal in a manner that results in an increase of said speed of said cooling element if said reading of said temperature of said electronic component is higher than a previous reading of said temperature.

66. The method of claim 59, further comprising modifying said control signal in a manner that results in a decrease of said speed of said cooling element if said reading of said temperature of said electronic component is lower than a previous reading of said temperature.

67. The method of claim 59, further comprising multiplying said tachometer output signal by an amplifying constant with said first control function.

68. The method of claim 59, further comprising:
   comparing said tachometer output signal to a value representing an ideal speed for said cooling element with said first control function; and
   generating said control signal based on said comparison.

69. A method of dissipating heat generated by an electronic component, said method comprising:
   adjusting a speed of operation of a cooling element with a control system in response to variation in power consumption of said electronic component; and
   recognizing trends in said power consumption and adjusting said speed of said cooling element according to rules programmed into said control system.

70. The method of claim 69, further comprising recognizing a spike in power consumption and ignoring said spike if said spike does not last more than a specified amount of time.

71. The method of claim 69, further comprising selectively ignoring said variations in power consumption.

72. The method of claim 69, further comprising performing predictive failure analysis for said cooling element.

73. The method of claim 72, further comprising sending a signal to a system thermal management controller reporting trends that indicate possible failure of said cooling element.

74. The method of claim 72, further comprising shutting down said cooling element and enabling a backup cooling element if said predictive failure analysis indicates that said cooling element could possibly fail within a set amount of time.

75. A system for dissipating heat generated by an electronic component, said system comprising:
   means for directly monitoring power consumption of said electronic component; and
   for adjusting a speed of operation of a cooling element in response to variations in power consumption of said electronic component.

76. The system of claim 75, further comprising means for adjusting said speed of said cooling element in response to variations in temperature of said electronic component.

77. The system of claim 75, further comprising means for increasing said speed of said cooling element when said power consumption of said electronic component increases.

78. The system of claim 75, further comprising means for decreasing said speed of said cooling element when said power consumption of said electronic component decreases.

79. The system of claim 76, further comprising means for increasing said speed of said cooling element when said temperature of said electronic component increases.

80. The system of claim 76, further comprising means for decreasing said speed of said cooling element when said temperature of said electronic component decreases.

81. The system of claim 76, further comprising means for implementing said control system in a system cooling solution.

82. The system of claim 81, further comprising means for outputting an alert signal from said control system to said system cooling solution, said system cooling solution comprising a system cooling element.

83. The system of claim 82, further comprising means for sending said alert signal in two stages, said two stages comprising:
   a first stage alert signal requesting said system cooling solution to increase a speed of said system cooling element; and
   a second stage alert signal requesting said system cooling solution to shut down said electronic component.

84. The system of claim 76, further comprising means for using said control system in combination with one or more other control systems for dissipating heat generated by electronic components in addition to said electronic component in an electronic device.

85. The system of claim 84, further comprising means for implementing each of said control systems in a system level cooling solution, said system level cooling solution comprising a system cooling element.

86. The system of claim 76, further comprising means for recognizing trends in said variations in temperature and adjusting said speed of said cooling element according to rules programmed into said control system.

87. A system for dissipating heat generated by an electronic component, said method comprising:
   means for adjusting a speed of operation of a cooling element in response to variations in power consumption of said electronic component; and
   means for generating a control signal for adjusting said speed of said cooling element with a first control function, said control signal derived from a tachometer output signal from said cooling element;
   means for modifying said control signal with a second control function, said modification based on a reading of said power consumption of said electronic component; and
   means for controlling said cooling element with said control signal that has been modified.

88. The system of claim 87, further comprising means for modifying said control signal in a manner that results in an increase of said speed of said cooling element if said reading of said power consumption is higher than a previous reading of said power consumption.

89. The system of claim 87, further comprising means for modifying said control signal in a manner that results in a decrease of said speed of said cooling element if said reading of said power consumption is lower than a previous reading of said power consumption.

90. A system for dissipating heat generated by an electronic component, said method comprising:
   means for adjusting a speed of operation of a cooling element in response to variations in power consumption of said electronic component; and
   means for generating a control signal for adjusting said speed of said cooling element with a first control function, said control signal derived from a tachometer output signal from said cooling element;
   means for modifying said control signal with a second control function, said modification based on a reading of said power consumption of said electronic component;
   means for modifying said control signal with a third control function, said modification based on a reading of a temperature of said electronic component; and means for controlling said cooling element with said control signal that has been modified.

91. The system of claim 90, further comprising:

means for comparing with said third control function said reading of said temperature of said electronic component to a preset value representing a maximum temperature at which said electronic component may properly operate; and means for modifying said control signal in a manner that results in said speed of said cooling element being adjusted to cool said electronic component to a temperature equal to or lower than said maximum temperature.

92. The system of claim 91, further comprising means for shutting down said electronic component if said temperature of said electronic component goes above said maximum temperature.

93. The system of claim 90, further comprising:

means for comparing said reading of said temperature of said electronic component to a preset value representing an ideal temperature at which said electronic component should operate; and means for modifying said control signal in a manner that results in said speed of said cooling element being adjusted to cool said electronic component to or below said ideal temperature.

94. The system of claim 90, further comprising means for modifying said control signal in a manner that results in an increase of said speed of said cooling element if said reading of said temperature of said electronic component is higher than a previous reading of said temperature.

95. The system of claim 90, further comprising means for modifying said control signal in a manner that results in a decrease of said speed of said cooling element if said reading of said temperature of said electronic component is lower than a previous reading of said temperature.

96. The system of claim 90, further comprising means for multiplying said tachometer output signal by an amplifying constant with said first control function.

97. The system of claim 90, further comprising:

means for comparing said tachometer output signal to a value representing an ideal speed for said cooling element with said first control function; and means for generating said control signal based on said comparison.

98. A system for dissipating heat generated by an electronic component, said method comprising:

means for adjusting a speed of operation of a cooling element in response to variations in power consumption of said electronic component; and means for recognizing trends in said power consumption and adjusting said speed of said cooling element according to rules programmed into said control system.

99. The system of claim 98, further comprising means for recognizing a spike in power consumption and ignoring said spike if said spike does not last more than a specified amount of time.

100. The system of claim 98, further comprising means for selectively ignoring said variations in power consumption.

101. The system of claim 98, further comprising means for performing predictive failure analysis.

102. A localized system for dissipating heat generated by an electronic component, said method comprising:

a controllable cooling element; and a control system for controlling said cooling element;

wherein said control system monitors actual power consumption of said electronic component and adjusts a speed of operation of said cooling element in response to variations in power consumption of said electronic component.

103. A localized system for dissipating heat generated by an electronic component, said method comprising:

a controllable cooling element; and a control system for controlling said cooling element;

wherein said control system monitors power consumption of said electronic component;

wherein said control system predicts a temperature of said electronic component based on said power consumption of said electronic component and adjust said operation of said cooling element based on said predicted temperature.

* * * * *